Dec. 7, 1937.  F. D. JOHNSON  2,101,394
MEAT BLOCK BRUSH
Filed July 14, 1936   4 Sheets-Sheet 1
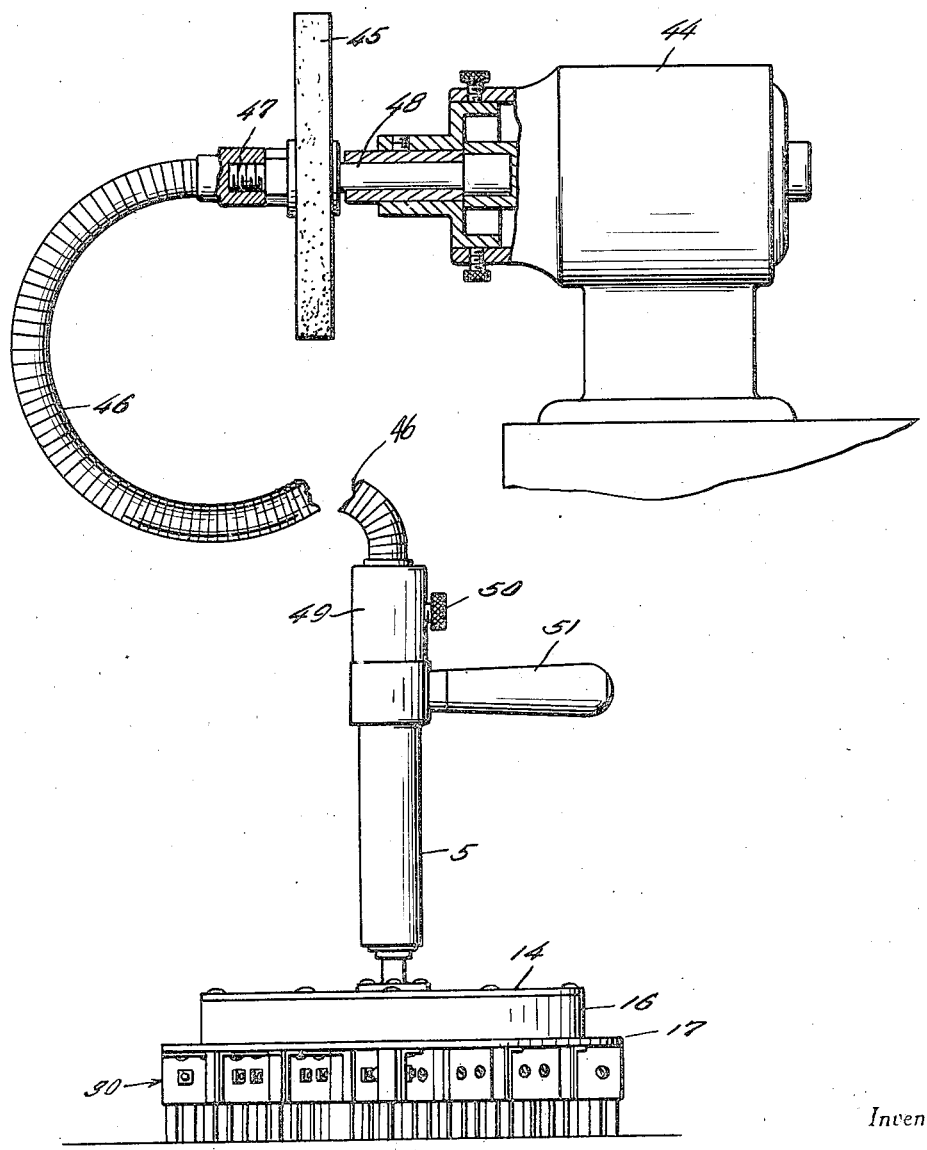
Inventor
F. D. Johnson
By Clarence A. O'Brien
Hyman Berman
Attorneys Dec. 7, 1937.　　　F. D. JOHNSON　　　2,101,394
MEAT BLOCK BRUSH
Filed July 14, 1936　　　4 Sheets-Sheet 2
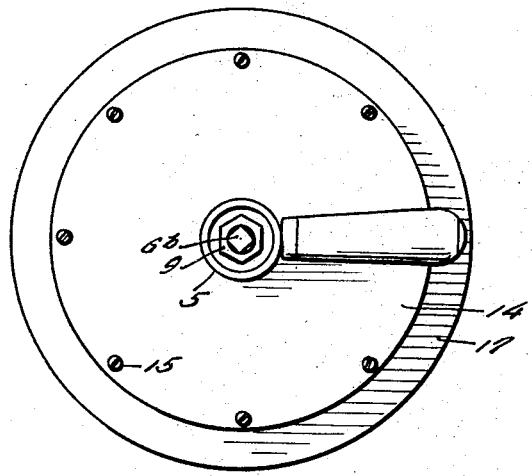
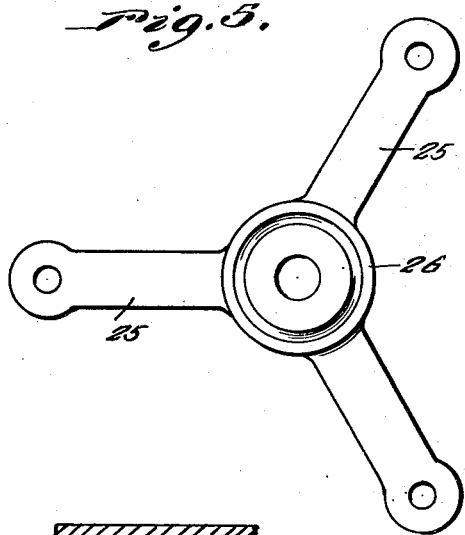
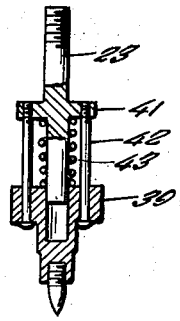
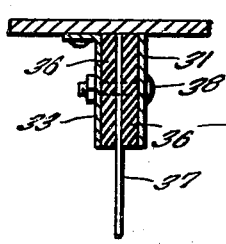
Inventor
F. D. Johnson
By Clarence A. O'Brien
Hyman Berman
Attorneys

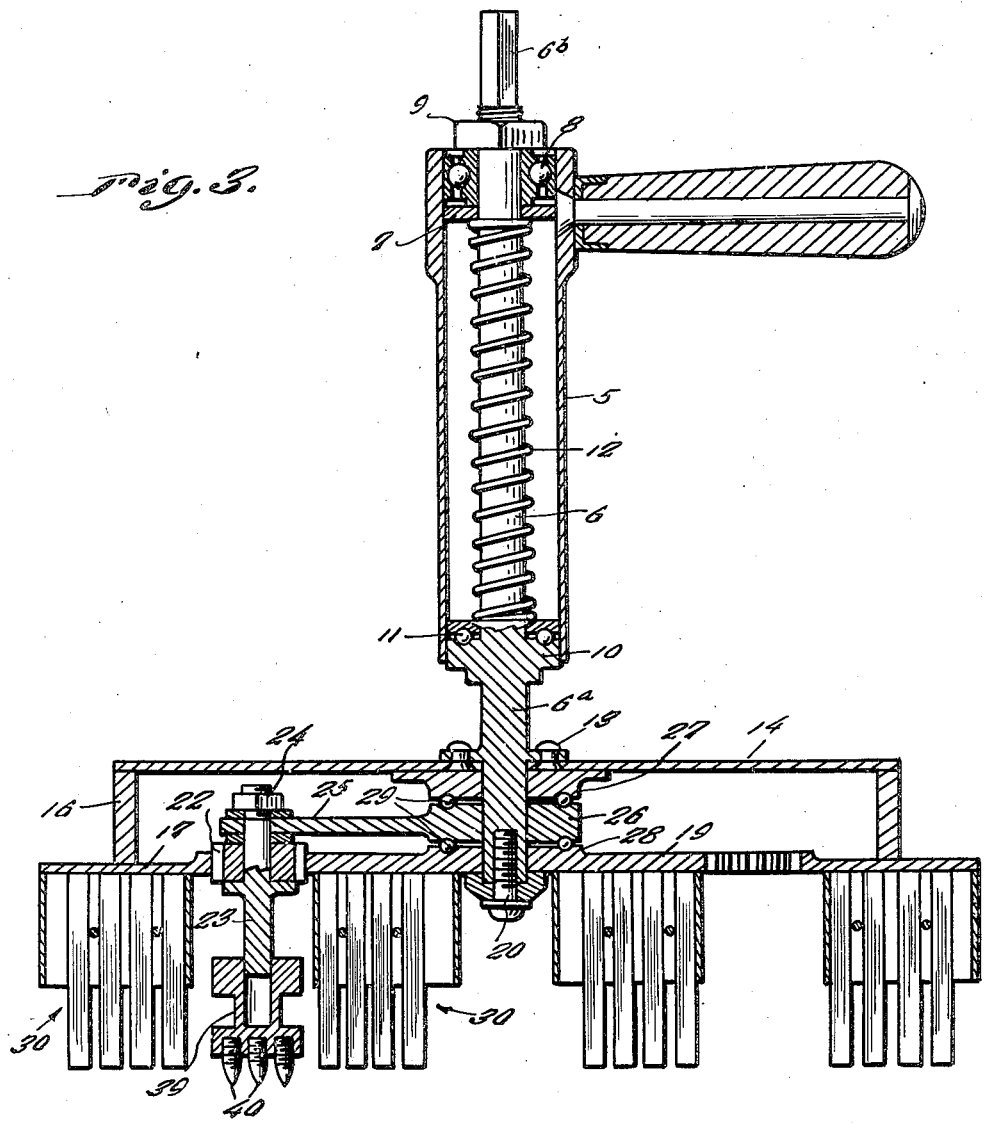
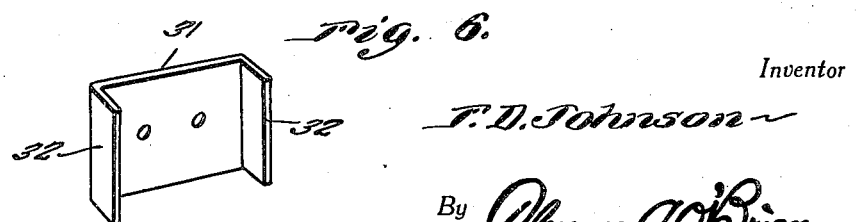

Dec. 7, 1937.　　　F. D. JOHNSON　　　2,101,394
MEAT BLOCK BRUSH
Filed July 14, 1936　　　4 Sheets-Sheet 4

Inventor

F. D. Johnson

By Clarence A. O'Brien
Hyman Berman
Attorneys

Patented Dec. 7, 1937

2,101,394

UNITED STATES PATENT OFFICE 2,101,394

MEAT BLOCK BRUSH

Franklin D. Johnson, Charleston, W. Va.

Application July 14, 1936, Serial No. 90,593

4 Claims. (Cl. 15—28)

This invention relates to brushes particularly designed for cleaning meat blocks and analogous hard, uneven surfaces, and an object of the invention is to provide an electrically driven rotary brush assembly which may be guided by hand across the surface of the block so as to clean and scrape the wood and remove any foreign matter.

A further object of the invention is to provide a rotary cleaning device of the character above mentioned which may be readily and easily placed in driven engagement with an electric motor, as for example, an electric motor forming part of a power driven sausage machine, meat grinder, or the like.

The invention together with its objects and advantages will be best understood from a study of the following description taken in connection with the accompanying drawings wherein:—

Figure 1 is a side elevational view illustrating the application of one form of the invention, and with certain parts broken away and shown in section.

Figure 2 is a top plan view of the rotary brush assembly per se.

Figure 3 is a vertical sectional view through the rotary brush assembly.

Figure 5 is a plan view of a spider member forming part of the invention.

Figure 6 is a perspective view of a plate forming part of one of the brush units.

Figure 7 is a detail sectional view of an anchoring prong.

Figure 8 is a detail section view through one of the brush units.

Figure 4:
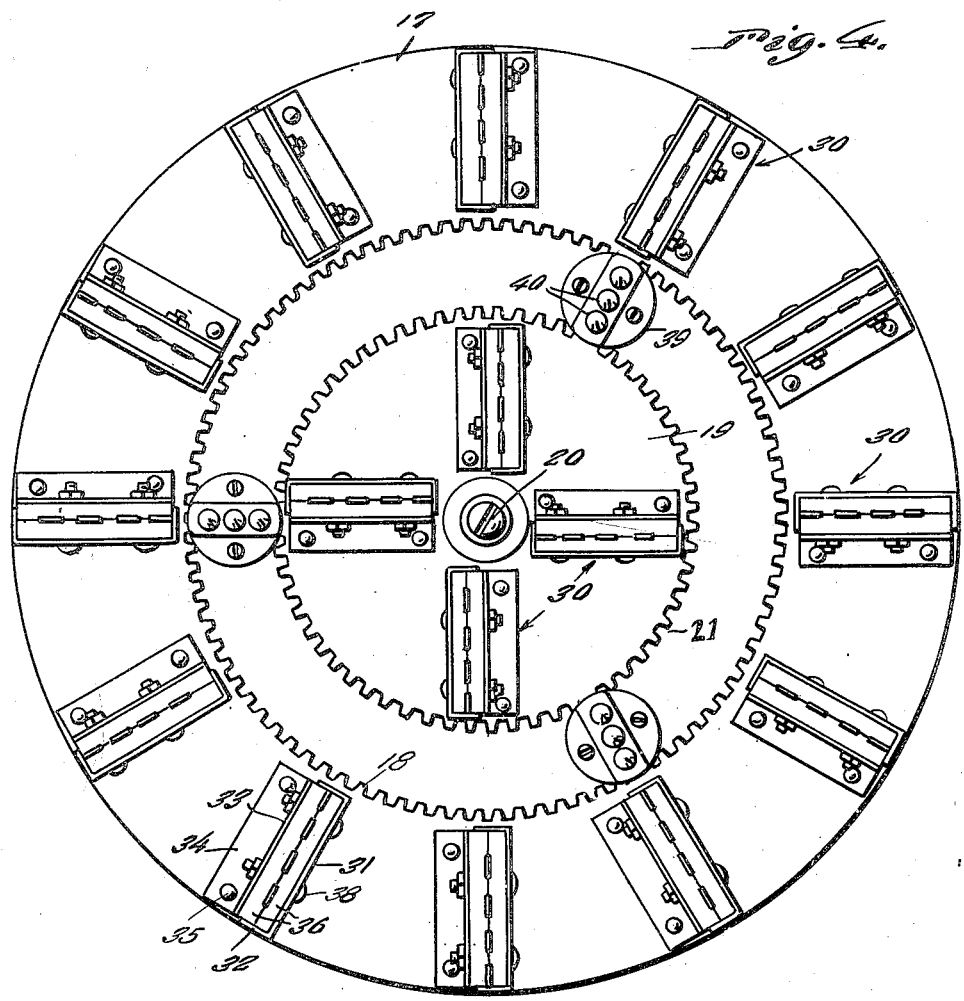
Figure 4 is a bottom plan view of the rotary brush assembly.
Figure 9:
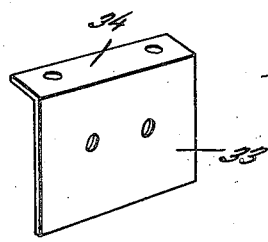
Figure 9 is a perspective view of a second plate forming part of the brush unit.

Referring to the drawings by reference numerals and more particularly to the form of the invention shown in Figures 1 to 9 inclusive, it will be seen that in that embodiment of the invention the brush or scraping device comprises a tubular member 5 through which extends a shaft 6 one end of which extends through an apertured guide plate 7 suitably secured at the upper end of the tube 5 as shown in Figure 3. At said one end the shaft 6 is also journaled in a bearing 8 suitably arranged within the upper end of the tube 5 and confined in position between the guide plate 7 and a nut 9 threaded on the shaft 6.

Adjacent its relatively opposite end the shaft 6 is diametrically enlarged as at 10 to have a sliding and rotating fit within the tube 5. At said enlarged end 10 the shaft 6 is equipped with a suitable bearing assembly 11 and interposed between the bearing assembly 11 and the guide plate 7 is a coil spring 12 which serves to normally urge the shaft 6 downwardly with respect to the casing 5.

At the lower end 6a thereof the shaft 6 has secured thereto as at 13 a circular plate 14 to the underside of which and at its marginal edge is secured through the medium of screws or the like 15 an annulus 16 forming a depending rim for the plate 14.

Secured to the lower edge of the rim 16 through the medium of the aforementioned screws 15 is a flat annular plate 17 the inner peripheral edge of which presents a toothed gear 18 for a purpose hereinafter made manifest.

Mounted on the lower end 6a of the shaft 6 for rotation about the end 6a of the shaft as an axis is a disk 19 retained on the end 6a of the shaft, in any suitable manner preferably as indicated generally at 20 in Figure 3. The disk 19 on its peripheral edge is provided with gear teeth 21 and meshing with the gear teeth 18 and 21 are pinion gears 22.

The pinion gears 22 are mounted for rotative movement on shanks 23 which at one end are suitably secured as indicated generally at 24 to the end of the arms 25 of a spider 26 the hub of which receives the shaft end 6a as shown in Figure 3 and is confined on the shaft end 6a between the plates 14 and 19.

To the underside of the plate 14 is secured a bearing race 27 while at the center thereof the plate 19 is provided with a bearing race 28 and the top and bottom faces of the hub of the spider 26 are suitably formed to provide bearing races complemental to the races 27 and 28 for accommodating anti-friction elements or ball bearings 29.

From the description of the invention thus far it will be seen that plate 14 will rotate with the shaft 6 for revolving the plate 17 in one direction, and drive from the plate 17 will be transmitted through the medium of the pinions 22 to the plate 19 for revolving the last mentioned plate in a direction reverse to the direction of rotation of the plate 17.

Plates 17 and 19 are provided on their undersides with a plurality of brush units, each of which is indicated generally by the reference numeral 30.

Each brush unit 30 comprises a head consisting of a plate member 31 provided at its respective opposite ends with flanges 32 and a complemental plate member 33 which bridges the spaces between the flanges 32 and is provided at its upper edge with an apertured flange 34 through the medium of which and suitable fastening elements 35 the brush unit 30 is secured to the underside of the plate 17 or the plate 19 as the case may be.

Confined within the boxing formed by the plates 31 and 33 are confronting blocks 36 of rubber or other suitable resilient material. Clamped between the meeting faces of the blocks 36 and relatively spaced, are the upper ends of bristles 37. The plates 36 as well as plates 31 and 33 are suitably apertured to accommodate bolts 38 arranged in alternate relation to the bristles 37 and through the medium of which the elements of the head and the aforementioned ends of the blades 37 are secured in assembled condition. The bristles 37 are preferably of steel.

Slidably associated with each of the aforementioned shanks 23 is a socket head 39 into the lower end of which are threaded or otherwise secured penetrating points 40. As best shown in Figure 7 each shank 23 has a shouldered part 41 into which are threaded the ends of guide rods or bolts 42, the headed ends of which extend through suitable openings provided therefor in the head 39. Thus the guide rods or bolts 42 will limit downward movement of the head 39 relative to threaded shank member 23, and the head 39 is normally urged downwardly for forcing the points 40 into the surface being worked upon through the medium of a coil spring 43 disposed about the lower portion of the shank 23 and interposed between the head 39 and the fixed flange or collar 41 of the shank as clearly shown in Figure 7.

In Figure 1 there is illustrated an electric motor which latter is indicated by the reference numeral 44 and is preferably of the type used as a part of a power driven sausage machine, meat slicer, or grinder.

In the present instance I have shown the motor 44 suitably equipped with an abrasive wheel 45 to be used for sharpening butchers' knives and the like.

In carrying out the invention it is further proposed to provide a flexible shaft 46 and to suitably couple one end of the shaft 46 as at 47 to the shaft 48 supporting the grinding or abrasive wheel 45 and which is suitably connected with the armature shaft of the motor 44 as shown in Figure 1.

At its relatively opposite end the flexible shaft 47 is provided with a socket 49 which is adapted to fit down over the squared end 6b of shaft 6 and is secured onto the end 6b of the shaft through the medium of a set screw 50. Thus it will be seen that through the medium of the flexible shafting 46 drive will be transmitted from the motor 44 to the shaft 6 for revolving the brush assembly on the end 6a of the shaft.

At its upper end the tube 5 is suitably provided with a laterally extending handle 51 so that the device as a whole may be manipulated by a single hand of the operator.

Obviously, when the motor is in operation rotary motion is imparted to the brush-carrying plate 17 for driving the plate 17 in one direction and to the brush-carrying plate 19 for driving the latter in a reverse direction, and as the device is moved over the surface to be cleaned the brushing units 30 effect a scraping or cleaning action on the surface, following any undulations thereof as the result of being yieldably forced towards the surface by the spring 12. In connection with the above it will be appreciated that the device may be held with the brushing unit 30 in working engagement with a selected section of the surface to be cleaned without untoward shifting of the device by reason of the penetrating points 40 which are yieldably held toward the surface by the springs 43 in a manner to imbed in the surface to hold the device relatively stationary as the scraping and brushing operation is performed on the selected section or part of the surface being cleaned.

It is thought that a clear understanding of the construction, utility and advantages of an invention of this character will be had without a more detailed description.

Having thus described the invention what is claimed as new is:—

1. In a device of the character described, a shaft, an annular plate secured to the shaft and having an inner circular edge provided with gear teeth, a second annular plate arranged within the confines of the first annular plate and mounted on the shaft to rotate about the shaft as an axis, said second annular plate having a peripheral edge provided with gear teeth, a spider member loose on the shaft and having arms provided with means engageable with the surface being worked upon for holding the spider member stationary, pinions mounted on the free ends of said arms and meshing with the teeth on the respective plates to impart differential rotary movement to the said plates, and each of said plates having a plurality of bristles depending from one side thereof.

2. In a device of the character described, a casing, a rotatable shaft supported by said casing, an annular plate secured to the shaft and having an inner circular edge provided with gear teeth, a second annular plate arranged within the confines of the first annular plate and mounted on the shaft to rotate about the shaft as an axis, said second annular plate having a peripheral edge provided with gear teeth, a spider member loose on the shaft and having arms, pinions mounted on the free ends of said arms and meshing with the teeth on the respective plates to transmit movement from the first plate to the second plate, means for holding the pinions stationary relative to the casing to drive the second plate in a direction reverse to the direction of rotation of the first plate, and a plurality of individual brushing assemblies secured to the underside of each of said plates.

3. In a device of the character described, a shaft, a tubular member concentric to and supporting said shaft, said shaft and tubular member being axially movable relative to one another, and said shaft being rotatable relative to the tubular member, an annular plate connected with one end of the shaft for rotation therewith and having a circular inner edge provided with gear teeth, a second plate mounted on said end of the shaft for rotation about said end of the shaft as an axis and provided with a peripheral edge equipped with gear teeth, a spider having a hub loose on said end of the shaft and arms extending from said hub, shanks secured at one end to said arms, pinions on said shanks for rotation about the shanks as axes said pinions meshing with the gear teeth on said plates for transmitting movement of the first plate to the second plate whereby the second plate is caused to revolve in a direction reverse to the direction of rotation of the first plate, brushing units secured to the underside of the respective plates, heads on the lower ends of said shanks and provided with penetrating prongs to pierce the surface being worked upon by said brush units, and spring means engaged with the said shaft and the said tubular member for thrusting said shaft in a direction to hold the said brushes against the said surface.

4. In a device of the character described, a shaft, a tubular member concentric to and supporting said shaft, said shaft and tubular member being axially movable relative to one another, and said shaft being rotatable relative to the tubular member, an annular plate connected with one end of the shaft for rotation therewith and having a circular inner edge provided with gear teeth, a second plate mounted on said end of the shaft for rotation about said end of the shaft as an axis and provided with a peripheral edge equipped with gear teeth, a spider having a hub loose on said end of the shaft and arms extending from said hub, shanks secured at one end to said arms, pinions on said shanks for rotation about the shanks as axes, said pinions meshing with the gear teeth on said plates for transmitting movement of the first plate to the second plate whereby the second plate is caused to revolve in a direction reverse to the direction of rotation of the first plate, brushing units secured to the underside of the respective plates, heads on the lower ends of said shanks, and said heads being provided with penetrating prongs to pierce the surface being worked upon by said brush units, said heads being slidably mounted on said shanks, means engaging said heads and shanks for limiting movement of the heads downwardly relative to the shanks, elastic means between the tubular member and the shaft for thrusting said shaft in a direction to hold the said brushes against the said surface and spring devices engaged with the shanks and the heads for yieldably impelling the heads towards the surface being cleaned.

FRANKLIN D. JOHNSON.